Sept. 11, 1962   W. A. DONOHUE   3,053,925
POROUS SINTERED PLATE
Filed Jan. 22, 1959

INVENTOR.
WALTER A. DONOHUE
BY
*George H. Fritzinger*
AGENT

3,053,925
POROUS SINTERED PLATE
Walter A. Donohue, Scotch Plains, N.J., assignor, by mesne assignments, to The Electric Storage Battery Company, Philadelphia, Pa., a corporation of New Jersey
Filed Jan. 22, 1959, Ser. No. 788,291
3 Claims. (Cl. 136—70)

This invention relates to an improved porous sintered electrode for alkaline storage batteries, and to a method of producing such improved electrodes.

Porous sintered plates are now commonly used as the means for carrying the active materials of battery electrodes. The amount of active material which can be introduced into a porous plate per unit volume thereof depends upon its porosity. As far as necessary electrical conductivity is concerned, porous sintered plates may have a porosity of 90% or better but such high porosity plates have low mechanical strength making it necessary that they be provided with supporting grid structures. However, an object of the present invention is to provide such high porosity sintered plate in an improved structural form providing the plate with an increased strength and durability which makes it practical for commercial use wtihout need for any reinforcing grid structure.

A further object is to provide an improved method of producing porous sintered bodies having porosities of the order of 90% and better.

A still further object is to provide a method adapted for producing porous sintered bodies in a continuous operation.

Features of the invention reside in preparing a wet mixture of metal powder with suitable processing agents and with infolding of air to form a foamy mass capable of being molded or extruded into formed plate-like bodies and of being then dried and sintered into self supporting structures without inclusion of any residue from the processing agents. Structural strength is achieved without use of a grid structure by providing such high porosity plate-like bodies prior to sintering with surface films of the same mixture without air inclusion, and then drying and bonding the laminar body into a self supporting structure by sintering.

Other objects and features of the invention will be apparent from the following description and the appended claims.

Figure 1:
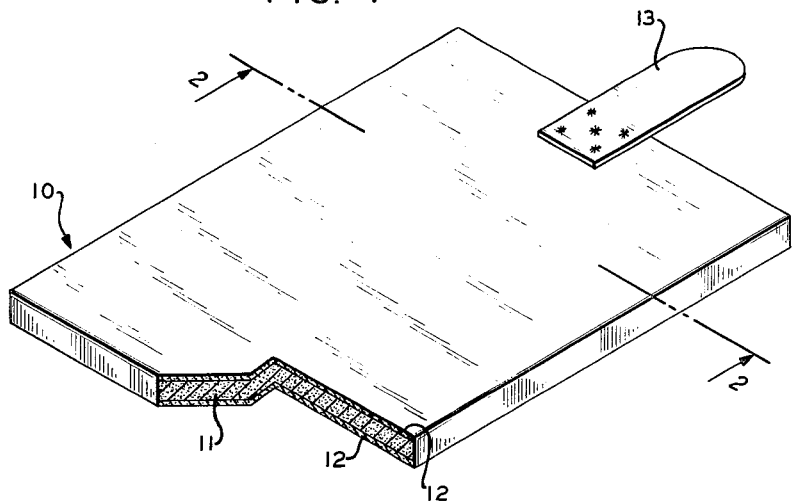
Figure 2:
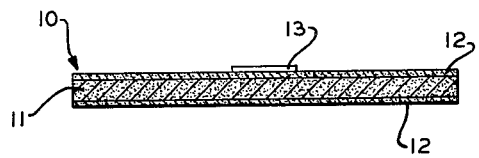

In the description of the invention, reference is had to the accompanying drawings of which:

FIGURE 1 is perspective view of a sintered electrode plate according to the invention, showing one corner portion broken away; and FIGURE 2 is a cross-sectional view taken on the line 2—2 of FIGURE 1.

The present sintered plates are preferably made of finely divided nickel powder sintered at an elevated temperature in a hydrogen atmosphere. The sintered plates are impregnated with active material in any suitable way. By "nickel powder" is meant a mixture of finely divided nickel metal with from 0% to 50% by weight of nickel oxide. The powdered nickel metal is made as by thermal decomposition of nickel carbonyl, by reduction of nickel compounds or by mechanically pulverizing substantially pure nickel metal.

In the figures there is shown a plate-like electrical body 10 of laminar structure comprising a central stratum 11 of high porosity sintered nickel powder and surface layers or films 12 of relatively low porosity nickel powder. Preferably, the central stratum has a porosity at least of the order of 90% and the surface films have porosities of the order of 70% to 80%. The surface films are preferably about one third as thick as the central stratum. Typically, an electrode may be about .025" in overall thickness and may be about 4" long and 3" wide. Secured as by spot welding to one face of the electrode is a conducting tab 13 of solid nickel metal about .010" thick. This tab may be ½" wide and 1½" long and may overlap the electrode over ½" of its length.

In the production of the central high porosity stratum 11, a batch of material is prepared by mixing in ratio by weight about 480 gr. of nickel powder, 100 ml. of water, 100 gr. of plasticizer such as of 60% Carbowax (polyethylene glycol) and 300 gr. of a processing agent preferably of 20% polyvinyl alcohol. Alternative processing agents which may be used are the Lucites (methyl, ethyl, butyl and isobutyl) and polyisobutylene, the desired properties of the processing agents being that they be film forming to prevent surface cracking and irregularities of the final product and that they evaporate well nigh completely during the sintering process to leave no residue in the final product. A feature of the invention in producing the high porosity central stratum is to so mix the above ingredients that there will be an infolding of air to form a foamy mass. This may be carried out with the use of a so-called Hobart mixer manufactured by the Hobart Manufacturing Company of Troy, New York. The material for the surface film is the same as the above but it is mixed without infolding of air with the use of a mixer having provision for dissipation of the vortex, a suitable mixer for this purpose being of the shear-flow type manufactured by Gabb Special Products, Incorporated, of Windsor Locks, Connecticut. The mixtures so formed have desirable flow and adhesive properties permitting them to be extruded or continually cast one upon the other to form a composite laminar plate-like body. Although any number of coats can be added continuously upon one another without intermediate drying, to form a multiple lamination of any desired thickness, the invention is preferably carried out with a single central stratum of relatively large thickness and high porosity with surface films on each side of relatively small thickness and low porosity. After such laminar body is dried to remove its moisture content, the same is sintered by heating to about 1500° F. for thirty minutes in a hydrogen atmosphere. During this sintering operation the plasticizer and processing agents are driven out without leaving any appreciable residue. Accordingly, there is provided a substantially pure plate-like body of nickel having surface films of relatively low porosity and a central core or stratum of high porosity. Such body can be impregnated with active material such as nickel hydroxide to form a positive electrode or with zinc or cadmium hydroxide to form a negative electrode. Although the final electrode so formed has an unusually high porosity and capability for holding active material it has still a high degree of mechanical strength by reason of the low porosity surface films bonded in one coherent and unitary integral structure with the central highly porous core. Also, the low porosity surface films prevent outflowing or loss of active material from the central core. Since the electrode has no solid metal grid or frame structure it has an unusually high weight and volume efficiency.

The embodiments of my invention herein particularly shown and described are intended to be illustrative and not limitative of my invention, since the same are subject to changes and modifications without departure from the scope of my invention, which I endeavor to express according to the following claims.

I claim:

1. A porous body for use as the carrier of the active material of a storage battery electrode, comprising a central stratum of high porosity sintered nickel powder having a porosity at least of the order of 90%, and surface layers of relatively low porosity sintered nickel powder on said central stratum to give strength and support to the latter, said central stratum and surface films being bonded into an integral sintered body and being free of surface cracks and irregularities.

2. The porous body set forth in claim 1 wherein both said porous central stratum and surface films are impregnated with battery active material.

3. The porous body set forth in claim 1 wherein said central stratum and surface films are composed of pure nickel metal.

References Cited in the file of this patent

UNITED STATES PATENTS

| | | |
|---|---|---|
| 1,988,861 | Thoraush et al. | Jan. 22, 1935 |
| 2,198,042 | Schlecht et al. | Apr. 23, 1940 |
| 2,544,112 | Schneider | Mar. 6, 1951 |
| 2,672,495 | Fleischer | Mar. 16, 1954 |
| 2,699,458 | Schlecht et al. | Jan. 11, 1955 |
| 2,708,212 | Koren et al. | May 10, 1955 |
| 2,833,847 | Salauze | May 6, 1958 |
| 2,881,237 | Duddy | Apr. 7, 1959 |
| 2,909,586 | Hagsphihl | Oct. 20, 1959 |